United States Patent [19]

Kokubun

[11] Patent Number: 4,962,396

[45] Date of Patent: Oct. 9, 1990

[54] SINGLE LOCK SWITCH FOR INPUTTING COMMANDS ASSOCIATED WITH SHOOTING IN MOVIE CAMERA

[75] Inventor: Kozo Kokubun, Tokyo, Japan

[73] Assignee: Fuji Photo Film Co., Ltd., Kanagawa, Japan

[21] Appl. No.: 284,007

[22] Filed: Dec. 13, 1988

[30] Foreign Application Priority Data

Dec. 22, 1987 [JP] Japan ............................... 62-322769

[51] Int. Cl.[5] ................................................ G03B 1/00

[52] U.S. Cl. .................................... 352/174; 352/178; 200/318.1

[58] Field of Search ............... 352/174, 178, 169, 175; 200/318.1, 318.2, 505; 310/68 A

[56] References Cited

U.S. PATENT DOCUMENTS

| | | | |
|---|---|---|---|
| 3,106,126 | 10/1963 | Kirk | 352/178 |
| 3,378,662 | 4/1968 | Sorenson | 200/318.1 |
| 3,597,561 | 8/1971 | Louzil et al. | 200/318.1 |
| 3,781,579 | 12/1973 | Rosenthal et al. | 200/318.1 |

FOREIGN PATENT DOCUMENTS 84624 7/1980 Japan .

*Primary Examiner*—Monroe H. Hayes
*Attorney, Agent, or Firm*—Sughrue, Mion, Zinn, Macpeak & Seas

[57] ABSTRACT

A shoot command entering switch for a video camera or similar movie camera is implemented by a single action switch and provided with a locking mechanism. The switch is allowed to enter a shoot start command and a shoot end command in the camera by a single manipulation. When the locking mechanism is actuated, the switch is held in a position for continuous shooting and therefore operable in the same manner as a double action switch. Such a construction facilitates the manipulations for ordinary or short-time shooting and those for long-time shooting which may be performed as desired.

11 Claims, 5 Drawing Sheets

SINGLE LOCK SWITCH FOR INPUTTING COMMANDS ASSOCIATED WITH SHOOTING IN MOVIE CAMERA

BACKGROUND OF THE INVENTION

1. Field of the Invention

The present invention relates to a video camera or similar movie camera and, more particularly, to a switch for inputting commands associated with shooting in such a camera.

2. Description of the Prior Art

In a video camera, for example, a shoot start/stop (S/S) button has customarily been implemented by a non-lock type switch which causes the camera to start shooting when pressed for the first time and causes it to end shooting when pressed again subsequently, i.e. a so-called double action switch. The double action switch is convenient to manipulate when the video camera is operated to shoot a desired scene continuously over a relatively long period of time. However, when it is desired to shoot a scene or scenes intermittently at relatively short intervals, the above-mentioned consecutive manipulations of the switch have to be repeated for each of the intermittent shots. Besides, in the case of such short-timing shooting, the operator is apt to shoot a desired scene while continuously pressing the S/S button and apt to misunderstand that the shooting has ended when released the S/S button.

In the light of the above, there has been proposed a video camera which uses a so-called single action switch in place of the double action switch discussed above. This type of video camera continuously shoots a scene while the S/S button in the form of a single action switch is pressed and stops shooting as soon as the switch is released. Although such a single action switch may be convenient to operate for intermittent shooting which occurs at short intervals, it is awkward to operate when it comes to shooting which continues over a substantial period of time because it has to be pressed continuously throughout the shooting. Furthermore, when the video camera with the single action switch is mounted on a tripod or similar pedestal, a person who operates the camera cannot join in the scene to be shot.

SUMMARY OF THE INVENTION

It is therefore an object of the present invention to provide a switch applicable to a movie camera which promotes convenient manipulations for entering commands associated with shooting.

In accordance with the present invention, a switch for use in a movie camera for entering commands for starting shooting comprises a movable member having a pressing surface which may be pressed in a first direction by an operator of the camera and being movable when the pressing surface is pressed, a resilient member constantly biasing the movable member in a second direction opposite to the first direction and maintaining the movable member in a first position, a retaining member for retaining the movable member in a second position, and a switch mechanism for entering the commands in the camera. The switch mechanism enters a shoot command in the camera when the movable member is moved from the first position to a third position in the first direction. When the movable member is moved to the second position, the retaining member retains the movable member in the second position and the switch mechanism continuously enters the shoot command.

Further, in accordance with the present invention, a switch for use in a movie camera for entering commands for starting and ending shooting comprises a movable member having a pressing surface which may be pressed by an operator of the camera and is being movable when the pressing surface is pressed, a resilient member constantly biasing the movable member in a second direction opposite to the first direction and retaining the movable member in in a first position, a retaining member for retaining the movable member in a second position when the movable member is moved from the first position to the second position in te first direction, and a switch mechanism for entering the commands in the camera. The switch mechanism enters a shoot command in the camera when the movable member is held in the second position. When the movable member is moved to the second position, the retaining member retains the movable member in the second position and the switch mechanism continuously enters the shoot command.

BRIEF DESCRIPTION OF THE DRAWINGS

The above and other objects and features of the present invention will become more apparent from the consideration of the following detailed description taken in conjunction with the accompanying drawings in which.

DESCRIPTION OF THE PREFERRED EMBODIMENTS

Figure 1:
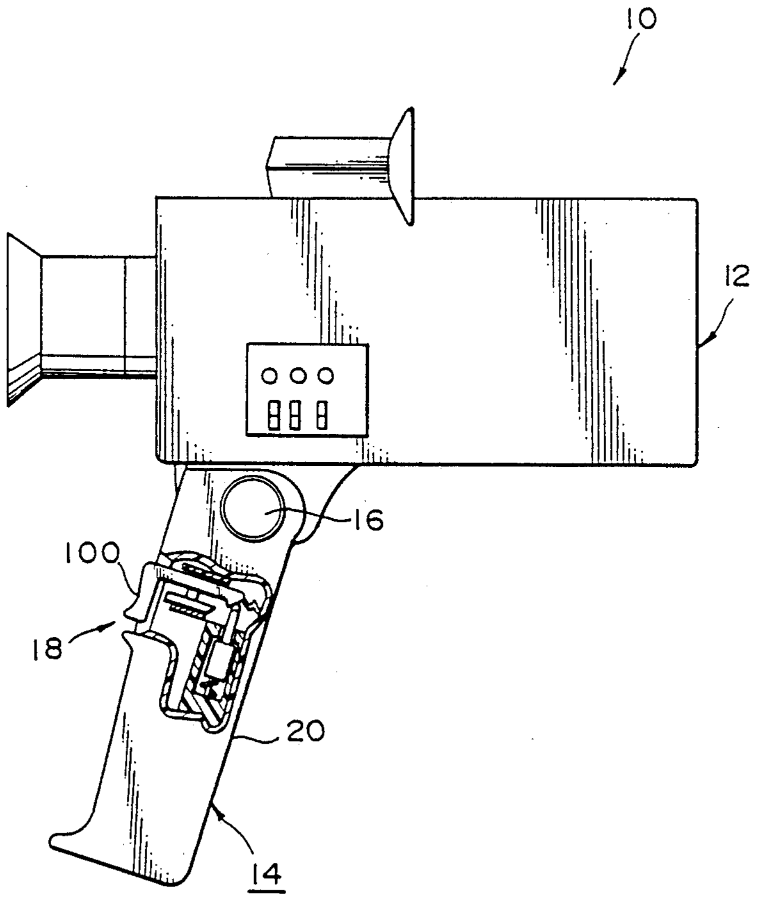
FIG. 1 is a partly sectional side elevation showing the overall construction of a movie camera to which a switch embodying the present invention is applied.

Referring to FIG. 1 of the drawings, a video camera to which a switch embodying the present invention is applied is shown and generally designated by the reference numeral 10. As shown, the video camera 10 is generally made up of a camera body 12 and a grip 14 which is rotatably connected to the camera body 12 by a shaft 16. In the illustrative embodiment, a single lock switch 18 is provided in the grip 14 and manually operable to enter a shoot start command and a shoot end command in the video camera 10 as desired. It is to be noted that the words "single lock switch" repeatedly appearing throughout this specification refer to a so-called single action switch which continues shooting while it is pressed and ends shooting when it is released and is provided with a locking mechanism. More specifically, the single lock switch should be understood to include both of a switch having a locking function itself and a switch whose locking function is implemented by a mechanism other than the switch.

Figure 2:
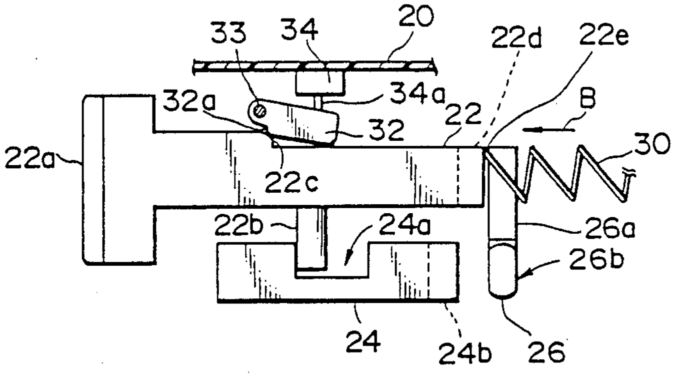
FIG. 2 is a plan view showing the mechanism of the switch shown in FIG. 1 in an enlarged scale.

FIG. 2 shows in an enlarged view a mechanism of the single lock switch 18 which is accommodated in a casing 20 of the grip 14. In the figure, the mechanism includes a movable member 22 which is provided with a surface 22*a* to be pressed by an operator, a projection 22*b*, a rounded portion 22*c*, and a surface 22*d* which is cut at an acute angle. An unlocking member 24 includes a recess 24*a* in which the projection 22*b* of the movable member 22 is received, and a surface 24*b* which is also cut at an acute angle. A lock switch 26 (see FIG. 4) includes a movable plunger (no numeral) which is provided with a surface 26*a* engageable with the surface 22*d* of the movable member 22 and a surface 26*b* engageable with the surface 24*b* of the unlocking member 24. The plunger of the lock switch 26 is constantly biased by a spring 28 in a direction indicated by an arrow A in FIG. 4. On the other hand, the movable member 22 is constantly biased by a spring 30 in a direction indicated by an arrow B.

The lock switch 26 serves the function of a switch for commanding a control section (not shown) of the camera body 12 the start and the stop of a shooting operation. More specifically, when the surface 22*d* of the movable member 22 and the surface 26*a* of the lock switch 26 are brought into contact with each other, the circuit for entering such commands is closed.

Figure 3:
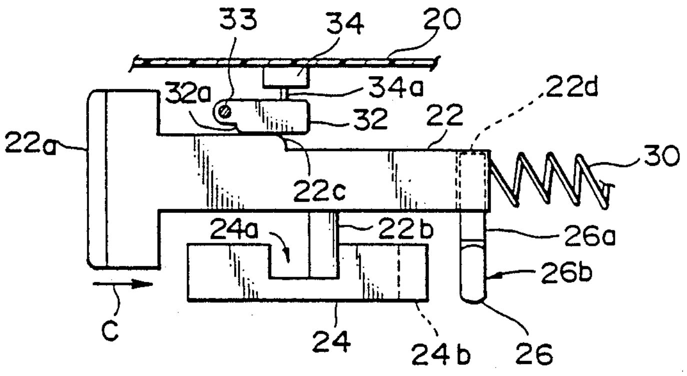
FIGS. 3, 5 and 7 are enlarged plan views demonstrating the operation of the switch shown in FIG. 2.

The single lock switch mechanism further includes a member 32 which is pivotally mounted on a pin 33 and constantly yieldably pressed against the movable member 22 by a resilient member 34*a* which extends out from a support member 34. As shown in FIG. 3, when the movable member 22 is urged in a direction indicated by an arrow C against the action of the spring 30, its rounded portion 22*c* in turn urges a rounded portion 32*a* of the member 32 away from the movable member 22 overcoming the force of the resilient member 34*a*. In such a configuration, when the surface 22*a* of the movable member 22 is pressed by the operator of the camera, the yieldable member 32 serves to exert some resistance to the manipulation at a point immediately before a shooting operation actually begins.

The operation of the single lock switch 18 having the above construction will be described with reference to FIGS. 2 to 9.

FIG. 2 shows the switch 18 in a stand-by condition. In this condition, the surface 22*a* of the movable member 22 is resiliently urged in the direction B by the compression spring 30 which is anchored to a surface 22*e* of the member 22 which is opposite to the surface 22*a*.

Figure 4:
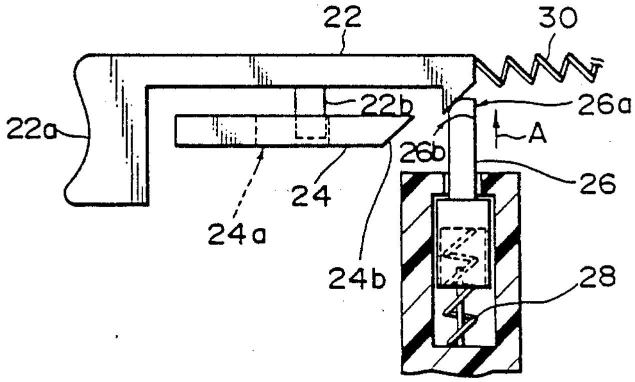
FIGS. 4, 6, 8 and 9 are enlarged side elevations useful for better understanding the operation of the switch shown in FIG. 2.

In FIGS. 3 and 4, the switch 18 is shown in a condition for performing a so-called single action switching operation. Specifically, as the operator touches the surface 22*a* of the movable member 22 to push it lightly in the direction C, the surface 22*d* of the movable member 22 is brought into contact with the surface 26*a* of the lock switch 26. As a result, the circuit for commanding the control section of the camera body 12 the start and the stop of a shooting operation is closed, as stated earlier.

Figure 5:
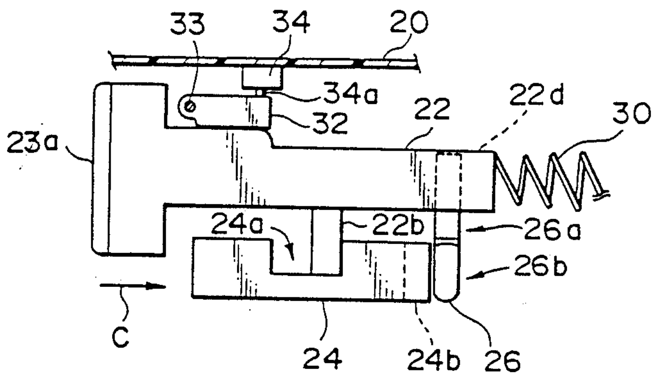
Figure 6:
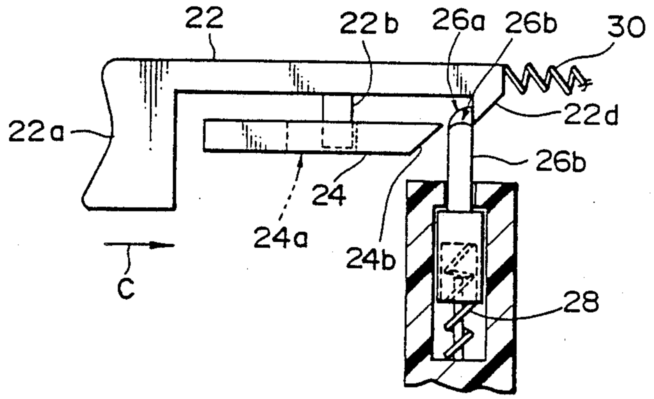

FIGS. 5 and 6 show the switch 18 which is locked in a shooting state in a plan view and a side elevation, respectively. Specifically, when the surface 22*a* of the movable member 22 is further pushed in the direction C from the position shown in FIGS. 3 and 4, the movable member 22 moves deeper into the grip casing 20 by urging the movable plunger of the lock switch 26 against the action of the spring 28. At the instant when the movable member 22 moves away from the plunger in the direction C, the movable plunger is thrusted by the spring 28 to between the surface 22*d* of the movable member 22 and the surface 24*b* of the unlocking member 24, as shown in FIG. 6. Consequently, the switch 18 is locked in a shooting position. In this instance, the circuit for entering a shoot start command and a shoot stop command as previously stated is held closed.

Figure 7:
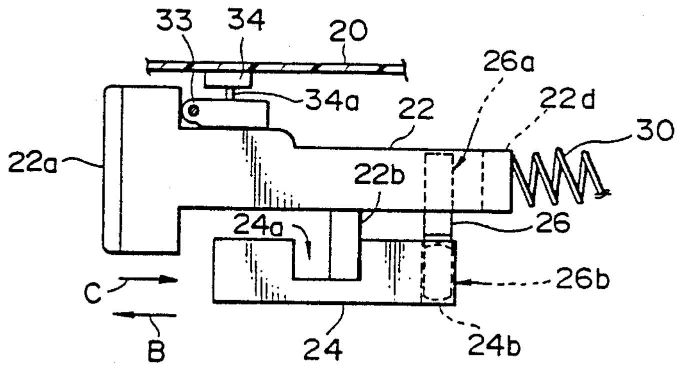
Figure 8:
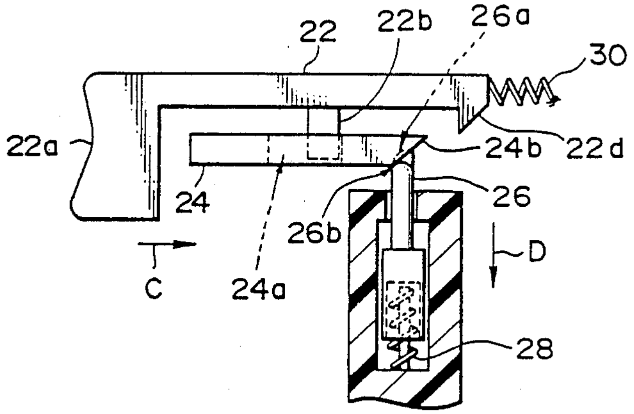
Figure 9:
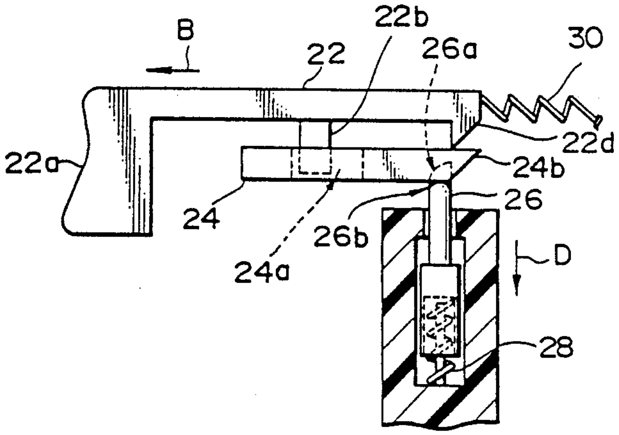

FIGS. 7 to 9 are views representative of a sequence of steps for unlocking the switch 18. To unlock the switch 18, the operator presses the surface 22*a* of the movable member 22 further in the direction C beyond the position shown in FIGS. 5 and 6. More specifically, when the surface 100 is urged in the direction C as stated, the movable member 22 is moved deeper into the casing 20 to in turn move the unlocking member 24 in the direction C with its projection 22*b* which is received in the recess 24*a* of the unlocking member 24 (see FIGS. 7 and 8). As the movable member 22 and unlocking member 24 are further moved in the direction C, the surface 24*b* of the unlocking member 24 abuts against the surface 26*b* of the lock switch 26 with the result that the lock switch 26 is urged in a direction D (see FIG. 8). Consequently, the lock switch 26 is released from the movable member 22 to open the circuitry for commanding the start and the end of shooting and thereby ends the shooting. Afterwards, as the operator releases the surface 22*a* of the movable member 22, the movable member 22 is urged by the spring 30 in the direction B to regain the standby position which has been described with reference to FIG. 2. The unlocking member 24 is moved together with the movable member 22 in the direction B resulting in the switch 18 being unlocked (see FIG. 9).

Figure 10:
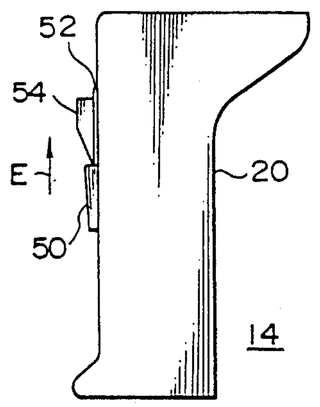
FIG. 10 is a side elevation of a grip of a movie camera to which an alternative embodiment of the switch in accordance with the present invention is applied.
Figure 11:
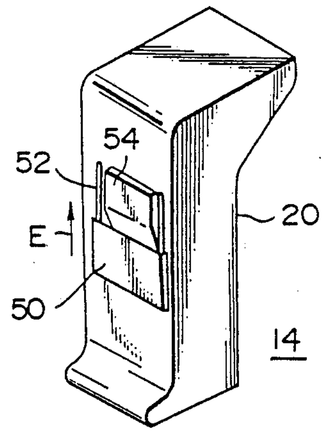
FIG. 11 is a perspective view of the grip shown in FIG. 10.

Referring to FIGS. 10 and 11, an alternative embodiment of the single lock switch 18 in accordance with the present invention is shown. In the figure, the casing 20 of the grip 14 is provided with a slidable cover or slider 50 and a slider guide 52 for guiding the slider 50. In this particular embodiment, the S/S button is implemented by an ordinary single action switch 54. For ordinary shooting which ends in a relatively short period of time, the S/S button 54 is operable to effect a single action switching operation. On the other hand, when it is desired to shoot a scene for a relatively long period of time, the slider 50 is pulled upward along the slider guide 52 as indicated by an arrow E until the slider 50 reaches a predetermined position for locking the S/S button 54 in a shooting position. To unlock the S/S button 54, the slider 50 is pushed downward along the slider guide 52 in the direction opposite to the direction E. As soon as the S/S button 54 is so unlocked, the shooting operation is ended.

Figure 12:
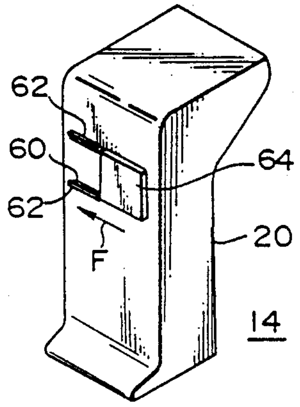
FIG. 12 is a perspective view of a grip of a movie camera to which another alternative embodiment of the present invention is applied.

Referring to FIG. 12, another alternative embodiment of the single lock switch 18 in accordance with the present invention is shown. In the figure, the same or similar structural elements as those shown in FIG. 1 are designated by the same reference numerals. In this particular embodiment, a switch guide 60 and a switch locking portion 62 are provided on the casing 20 of the grip 14. The S/S button is implemented by an ordinary single action switch 64 as in the embodiment of FIGS. 10 and 11. For usual shooting, the S/S button 64 is operable to perform single action switching operations. On the other hand, to shoot a scene for a long period of time, for example, the S/S button 64 is moved along the switch guide 60 in a direction indicated by an arrow F while being pressed toward the casing 20 of the grip 14. As soon as the S/S button 64 is brought into engagement with the switching locking portion 62, it is locked in a predetermined shooting position. To unlock the switch button 64, it is moved along the switch guide 60 in the direction opposite to the direction F until it becomes clear of the locking portion 62.

Figure 13:
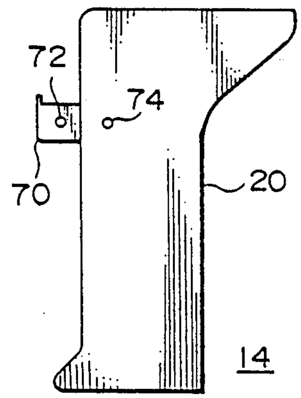
FIG. 13 is a side elevation of a grip of a movie camera to which still another alternative embodiment of the present invention is applied.

FIG. 13 shows a further alternative embodiment of the single lock switch 18. In this embodiment, the S/S button is also comprised of an ordinary single action switch 70. In FIG. 13, a switch lock button 72 yieldably protrudes from one of opposite side surfaces of the S/S button 70 while an aperture 74 is formed through one side wall of the casing 20 of the grip 14 in alignment with the switch lock button 72 with respect to the depthwise direction of the casing 20. For ordinary shooting, the S/S button 70 is pressed lightly toward the casing 20 to effect single action switching actions. To shoot a scene for a long period of time, for example, the S/S button 70 is pressed deeper into the casing 20 with the switch lock button 72 being pressed in a direction perpendicular to the sheet surface of FIG. 13. The S/S button 70 is locked in a predetermined shooting position when it is mated with the aperture 74 which is formed through the casing 20. The S/S button 70 is unlocked by pressing the switch lock button 72 into the casing 20 until the button 72 becomes clear of the aperture 74.

As described above, in any of the embodiments shown and described, a single lock switch performs a so-called single action switching operation for continuing shooting while an S/S button is pressed and for ending the shooting when the button is released. Further, when a locking mechanism associated with the single lock switch is actuated, the switch is operable in the same manner as a double action switch. Hence, the single lock switch facilites both of short-time shooting and long-time shooting as desired.

It is to be noted that the single lock switch in accordance with the present invention is of course applicable to a video camera having a recorder integrally therewith or an independent recorder and to a video camera of the type using a silver-halide photographic film. Further, the single lock switch is usable with a camera of the type outputting a video signal directly to a monitor without the intermediary of a video tape or similar recording medium.

In summary, in accordance with the present invention, a shoot command entering switch of a movie camera is implemented by a switch capable of starting and ending shooting by a single manipulation and with which a locking mechanism for locking the switch in a shooting position. Hence, the shoot command entering switch promotes the ease of operation for both of ordinary or short-time shooting and long-time shooting.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A switch, operable by a single finger of the operator, for use in a movie camera for entering commands for starting and ending shooting, comprising:

a movable member having a pressing surface which may be pressed in a first direction by an operator of said camera and being movable when said pressing surface is pressed;

a resilient member constantly biasing said movable member in a second direction opposite to the first direction and maintaing said movable member in a first position;

a retaining member for retaining said movable member in a second position;

an unlocking member, connected to said movable member and moveable with said movable member in said first direction, said unlocking member being operative to said second position by further movement of said movable member in said first direction to release said movable member from said retaining member and switch means for entering the commands in said camera;

said switch means entering a shoot command in said camera when said movable member is moved from the first position to a third position in the first direction;

when said movable member is moved to the second position, said retaining member is operative to retain said movable member in the second position and to cause said switch means to be continuously entering the shoot command.

2. A switch in accordance with claim 1, wherein said movable member reaches the second position when further moved from the third position in the first direction.

3. A switch in accordance with claim 1, further comprising a casing which constitutes a grip for supporting said camera, said movable member, said resilient member, said retaining member and said switch means being accommodated in said casing.

4. A switch, operable by a single finger of the operator, for use in a movie camera for entering commands for starting and ending shooting, comprising:

a movable member having a pressing surface which may be pressed in a first direction by an operator of said camera and being movable when said pressing surface is pressed;

a resilient member constantly biasing said movable member in a second direction opposite to the first direction and retaining said movable member in a first position;

a retaining member for retaining said movable member in a second position when said movable member is moved from the first position to the second position in the first direction said retaining member comprising an engaging member which, when said movable member is in the second position, engages with and urges said pressing surface to retain said pressing surface in the second position; and switch means for entering the commands in said camera;

said switch means entering a shoot command in said camera when said movable member is held in the second position; when said movable member is moved to the second position, said retaining member retaining said movable member in the second position and said switch means continuously entering the shoot command.

5. A switch in accordance with claim 4, wherein said retaining member comprises an engaging member which, when said movable member is in the second position, engages with and urges said pressing surface to retain said pressing surface in the second position.

6. A switch in accordance with claim 5, wherein said engaging member is movable in a third direction which is substantially perpendicular to the first direction and engages said pressing surface when moved in the third direction.

7. A switch in accordance with claim 5, wherein said movable member is also movable in a third direction which is substantially perpendicular to the first direction, said engaging member engaging said pressing surface when said movable member is moved in the third direction.

8. A switch in accordance with claim 4, wherein said movable member comprises a lug extending substantially perpendicularly to the first direction, said retaining member being formed with an aperture which mates with said lug when said movable member is in the second position.

9. A switch in accordance with claim 4, further comprising a casing which constitutes a casing for supporting said camera, said movable member, said resilient member, said retaining member and said switch means being accommodated in said casing.

10. A switch for use in a movie camera for entering commands for starting and ending shooting, comprising:

a movable member having a pressing surface, which may be pressed in a first direction by an operator of said camera, and being movable when said pressing surface is pressed among a first, second and third position, said moveable member reaching said second position when it is further moved in said first direction from said third position;

a resilient member constantly biasing said movable member in a second direction, opposite to said first direction, and urging said movable member toward said first position;

a retaining member for retaining said movable member in said second position, said retaining member comprising a movable plunger which is constantly biased in a third direction substantially perpendicular to the first and second directions, and a lug engageable with said plunger and operative to urge said plunger in a fourth direction opposite to the third direction when said movable member is moved in said first direction; and switch means for entering the commands in said camera, said switch means entering a shoot command in said camera when said movable member is moved from said first position to said third position in said first direction and, when said movable member is moved to said second position, said retaining member being operative to retain said movable member in said second position and cause said switch means to continuously entering the shoot command, said switch means further comprising a releasing member operatively linked with said movable member such that, when said movable member is further moved from said second position in said first direction, said releasing member is moved to release said lug from said plunger and cause said moveable member to move in said second direction.

11. A switch for use in a movie camera for entering commands for starting and ending shooting, comprising:

a longitudinal movable member having a pressing surface at one end thereof which may be pressed in a first direction by an operator of said camera and an engageable protrusion having a first cam surface at a second end thereof, said member being sequentially movable in said first direction from a first position to a third position and to a second position when said pressing surface is pressed;

a resilient member constantly biasing said movable member in a second direction opposite to said first direction and operative to normally urge said movable member to said first position;

a retaining member for retaining said movable member in said second position when said movable member is moved from said first position to said second position in said first direction, said retaining member comprising an engaging member biased toward said movable member second end and having a second cam surface, engageable with said first cam surface when said movable member is at said second position and operative to be moved away from said movable member second end by the interaction of said first and second cam surfaces, and a third cam surface;

a releasing means, movable with said second member in said first direction and having a fourth cam surface operative to interact with said third cam surface when said movable member is moved in said first direction beyond said third position and to move said engaging member against its bias, thereby releasing said engageable protrusion; and switch means for entering the commands in said camera, said switch means entering a shoot command in said camera when said movable member is held in said second position and, when said movable member is moved to the second position, said retaining member retaining said movable member in the second position and said switch means continuously entering the shoot command.

* * * * *